(12) United States Patent
Saylor (10) Patent No.: US 10,440,933 B1
(45) Date of Patent: Oct. 15, 2019

(54) LITTER BOX ENCLOSURE

(71) Applicant: Christina Saylor, Scottsdale, AZ (US)

(72) Inventor: Christina Saylor, Scottsdale, AZ (US)

( * ) Notice: Subject to any disclaimer, the term of this patent is extended or adjusted under 35 U.S.C. 154(b) by 450 days.

(21) Appl. No.: 15/420,301

(22) Filed: Jan. 31, 2017

(51) Int. Cl.
*A01K 1/01* (2006.01)
*A01K 1/015* (2006.01)

(52) U.S. Cl.
CPC .......... *A01K 1/0125* (2013.01); *A01K 1/0157* (2013.01)

(58) Field of Classification Search
CPC .. A01K 1/0157; A01K 1/0107; A01K 1/0152; A01K 1/0245; A01K 1/035; A01K 1/033; A01K 1/03; A01K 1/0035; A01K 1/011; A01K 1/0353; A01K 1/01; A01K 1/0272; A01K 1/034; B65D 5/16; B65D 5/542
USPC .............. 119/165, 161, 416, 479, 482, 484; 206/774, 738, 736; 229/103, 122, 240, 229/242
See application file for complete search history.

(56) References Cited

U.S. PATENT DOCUMENTS

| | | | |
|---|---|---|---|
| 1,773,141 A * | 8/1930 | Hodgson | A01K 1/0107 119/165 |
| 2,115,673 A * | 4/1938 | Stompe | B65D 5/16 206/215 |
| 2,346,488 A * | 4/1944 | Hoffmaster | B65D 5/16 206/449 |
| D214,739 S * | 7/1969 | Freeborn | D30/161 |
| 3,581,977 A * | 6/1971 | Kirsky | A01K 1/0125 229/128 |
| D237,392 S * | 10/1975 | Freeborn | D30/161 |
| 4,548,160 A * | 10/1985 | Feitelson | A01K 1/0125 119/168 |
| 4,715,511 A * | 12/1987 | Bohlen | B65D 77/064 229/102 |
| 5,035,205 A * | 7/1991 | Schiller | A01K 1/0125 119/165 |
| 5,080,046 A * | 1/1992 | Cassone | A01K 1/0125 119/165 |
| 5,211,134 A * | 5/1993 | Bolo, III | A01K 1/0107 119/168 |
| D346,677 S | 5/1994 | Casmira | |
| 5,992,350 A | 11/1999 | Manzo | |
| 6,065,429 A | 5/2000 | Crosse | |
| 6,109,211 A | 8/2000 | Tomlinson | |
| 6,415,738 B1 | 7/2002 | Hotter | |
| 6,918,487 B2 * | 7/2005 | Harrelson | B65D 5/725 206/427 |
| 7,431,163 B2 * | 10/2008 | Andersen | B65D 5/52 206/45.29 |
| 7,610,877 B2 | 11/2009 | Garfield | |
| 7,673,789 B2 * | 3/2010 | DeBusk | B65D 71/36 206/427 |
| D613,914 S * | 4/2010 | Askinasi | D30/161 |

(Continued)

FOREIGN PATENT DOCUMENTS

WO 20040623555 A1 7/2004

*Primary Examiner* — Yvonne R Abbott-Lewis (57) ABSTRACT

The litter box enclosure is an inexpensive protective cover for a litter box. It protects nearby walls and floors from damage due to splattered urine and feces. A perforated portion of the top of the enclosure can be detached to provide a mat for added floor protection in front of the enclosure. Additional perforations allow areas on the sides of the enclosure to be removed for the purpose of allowing light into the enclosure.

14 Claims, 6 Drawing Sheets

(56) References Cited

U.S. PATENT DOCUMENTS

| | | | |
|---|---|---|---|
| 7,762,394 B2* | 7/2010 | Bradford | B25J 7/00 206/427 |
| 7,998,047 B2* | 8/2011 | Spivey, Sr. | B65D 5/0227 493/88 |
| 8,336,497 B2 | 12/2012 | van Zuilekom | |
| 8,668,132 B2* | 3/2014 | Lopez Masague | B65D 5/103 229/117 |
| D711,601 S* | 8/2014 | Robbins | D30/161 |
| 8,857,375 B1 | 10/2014 | Miller | |
| 8,998,074 B2* | 4/2015 | Schomisch | B65D 5/32 206/736 |
| D819,900 S* | 6/2018 | Wurth | D30/161 |
| 2003/0146130 A1* | 8/2003 | Kanter | B65D 5/001 206/774 |
| 2003/0146269 A1* | 8/2003 | Auclair | B65D 5/16 229/120.24 |
| 2004/0188277 A1* | 9/2004 | Auclair | B65D 71/36 206/139 |
| 2004/0200425 A1 | 10/2004 | Paquette | |
| 2005/0263434 A1* | 12/2005 | Tibbels | B65D 5/0227 206/767 |
| 2006/0060643 A1* | 3/2006 | Sheffer | B65D 5/22 229/242 |
| 2006/0162666 A1 | 7/2006 | Mitchell | |
| 2007/0257096 A1* | 11/2007 | Coltri-Johnson | B65D 5/4295 229/242 |
| 2018/0305071 A1* | 10/2018 | Purkey | B65D 5/725 |

* cited by examiner

LITTER BOX ENCLOSURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet care, more specifically, a disposable litter box enclosure.

SUMMARY OF INVENTION

The litter box enclosure is an inexpensive protective cover for a litter box. It protects nearby walls and floors from damage due to splattered urine and feces. A perforated portion of the top of the enclosure can be detached to provide a mat for added floor protection in front of the enclosure. Additional perforations allow areas on the sides of the enclosure to be removed for the purpose of allowing light into the enclosure.

An object of the invention is to provide a protective enclosure around a litter box to protect walls and floors from urine and feces damage.

A further object of the invention is to provide a detachable portion of the top of the box that can be moved to a position under the front of the box to provide additional floor protection.

Yet another object of the invention is to provide perforated cut-outs that may be removed to allow light from a night light to enter the litter box enclosure.

These together with additional objects, features and advantages of the litter box enclosure will be readily apparent to those of ordinary skill in the art upon reading the following detailed description of the presently preferred, but nonetheless illustrative, embodiments when taken in conjunction with the accompanying drawings.

In this respect, before explaining the current embodiments of the litter box enclosure in detail, it is to be understood that the litter box enclosure is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the litter box enclosure.

It is therefore important that the claims be regarded as including such equivalent construction insofar as they do not depart from the spirit and scope of the litter box enclosure. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word 'or' is intended to be inclusive.

Detailed reference will now be made to a first potential embodiment of the disclosure, which is illustrated in FIGS. 1 through 7.

A litter box enclosure 100 (hereinafter invention) comprises a protective box 200 that may be used to house a litter box 600 for the purpose of protecting nearby walls and floors from urine and feces damage. The protective box 200 opens on a box front side 340 and the litter box 600 is placed on a box floor 330 of the protective box 200 so that a box left side 300, a box right side 310 and a box back side 350 are interposed between the litter box 600 and a room side wall 630, a room rear wall 640, and a room floor 650. In addition, a box top 320 protects additional portions of the room side wall 630 and the room rear wall 640.

The invention 100 further comprises a bottom flap 230, a left flap 210, and a right flap 220. A first edge 400 connects the bottom flap 230 to the box floor 330 along the front of the box floor 330. The connection between the bottom flap 230 and the box floor 330 is a fold, meaning that with minimal effort a human can reorient the angle formed by the bottom flap 230 relative to the box floor 330.

A second edge 410 connects the left flap 210 to the box left side 300 along the front edge of the box left side 300. The connection between the left flap 210 and the box left side 300 is a fold, meaning that with minimal effort a human can reorient the angle formed by the left flap 210 relative to the box left side 300.

A third edge 420 connects the right flap 220 to the box right side 310 along the front edge of the box right side 310. The connection between the right flap 220 and the box right side 310 is a fold, meaning that with minimal effort a human can reorient the angle formed by the right flap 220 relative to the box right side 310.

The left flap 210 and the right flap 220 provide additional protection to the room side wall 630 and the room floor 650 near the invention 100 by constituting an additional physical barrier through which urine and feces would have to pass from the litter box 600 to reach the room side wall 630 and portions of the room floor 650.

The invention 100 further comprises a top flap 240. A fourth edge 430 connects the top flap 240 to the box top 320 along a front edge of the box top 320. The connection between the top flap 240 and the box top 320 is a fold, meaning that with minimal effort a human can reorient the angle formed by the top flap 240 relative to the box top 320.

Furthermore, the invention 100 comprises a detachable floor mat 250. The detachable comprises the top flap 240 and a front portion 290 of the box top 320. A first perforation 500 makes it possible to separate the detachable floor mat 250 from the rest of the invention 100. In the process of removing the detachable floor mat 250, the top flap 240 along with the front portion 290 of the box top 320 are separated from the remainder of the litter box enclosure by breaking the invention 100 along the first perforation 500. In general, the first perforation 500 begins at a front left corner 370 of the box top 320 and runs for a first distance 550 along a left edge 362 of the box top 320 towards a back edge 366 of the box top 320.

The first perforation 500 then changes direction and runs perpendicular to the left edge 362 of the box top 320 and parallel to the fourth edge 430 of the box top 320 until it reaches a right edge 364 of the box top 320 where it changes direction again and begins running towards the fourth edge 430 of the box top 320 along the right edge 364 of the box top 320. The first perforation 500 continues in this direction until it reaches a front right corner 375. The transition of the first perforation 500 from running along the left edge 362 of the box top 320 to running parallel to the fourth edge 430 of the box top 320 and the transition of the first perforation 500 from running parallel to the fourth edge 430 of the box top 320 to running along the right edge 364 of the box top 320 may be right angle transitions or they may be gradual curves.

In some embodiments the first perforation 500 may define other cut-out shapes for the front portion 290 of the box top 320. As a non-limiting example, the first perforation 500 may trace a semi-circle from the front left corner 370 to the front right corner 375. It shall be noted that the protective box 200 may be made of a translucent material or opaque with different colors and/or designs imprinted thereon.

Once the detachable floor mat 250 has been separated from the rest of the invention 100, the detachable floor mat 250 may be placed on the floor in front of the invention 100 and it may be slid under the bottom flap 230 of the invention 100. This allows the litter box 600 to then be placed so that it rests on the box floor 330, the bottom flap 230, and the detachable floor mat 250 simultaneously. The advantage of doing so is that the detachable floor mat 250 now provides an extended area of floor protection in front of the invention 100.

The invention 100 may further comprise one or more night light cut-outs 260. The one or more night light cut-outs 260 comprise one or more second perforations 510 which define areas of the litter box enclosure which may be removed to allow the invention 100 to align with a night light 670 plugged into a wall outlet 660 and thus provide light in the area of the litter box 600 when the litter box 600 is placed inside of the invention 100. In general, the one or more second perforations 510 may be located on the box left side 300, the box right side 310, the box back side 350, or combinations thereof.

In some embodiments, several of the one or more second perforations 510 may be provided on each of the three side just named to allow maximum flexibility in matching the invention 100 placement relative to the wall outlet 660 placement and height (as measured from the floor).

In general, the invention 100 is constructed from cardboard 280 and may have a plastic coating 270 on all or selected portions of the invention 100 to make it more impervious to urine and feces. It shall be noted that the invention 100 may be made of other materials, and not be limited to cardboard as the sole material. In some embodiments, the invention 100 may be sold as a disposable item that may be used for a period of time and then discarded, to be replaced by another invention 100.

Figure 1:
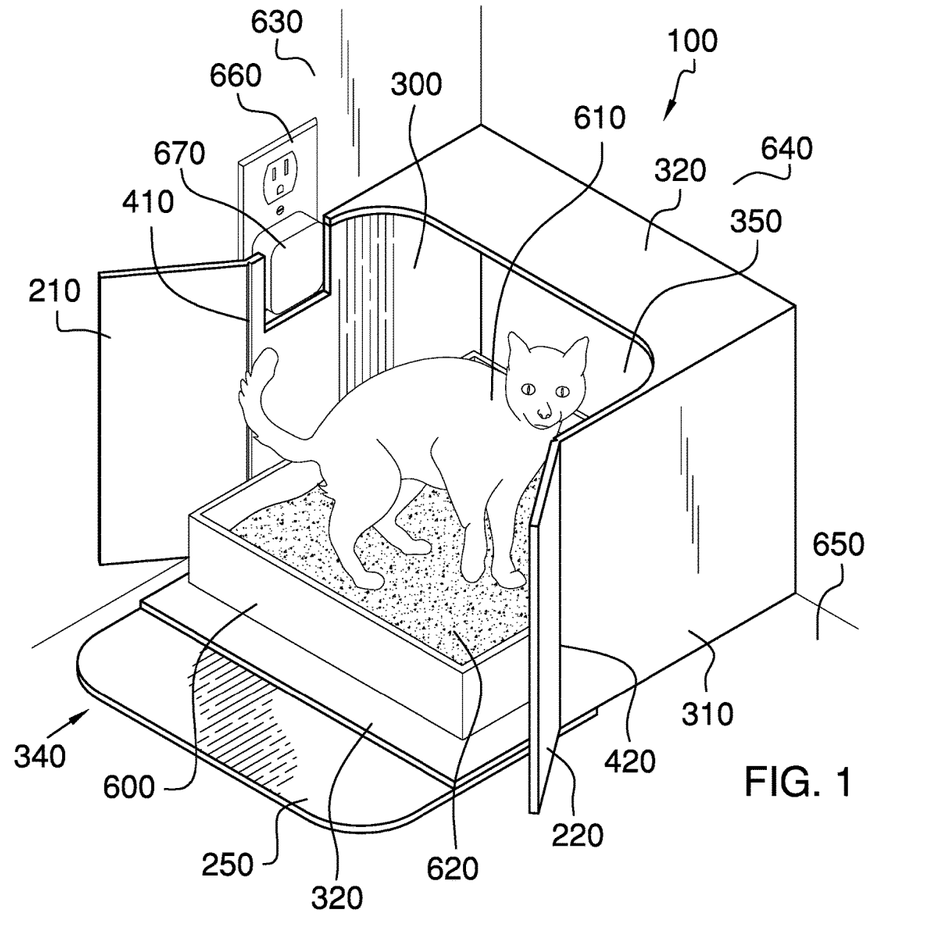
FIG. 1 is a perspective view of an embodiment of the disclosure showing the litter box enclosure in use.
Figure 2:
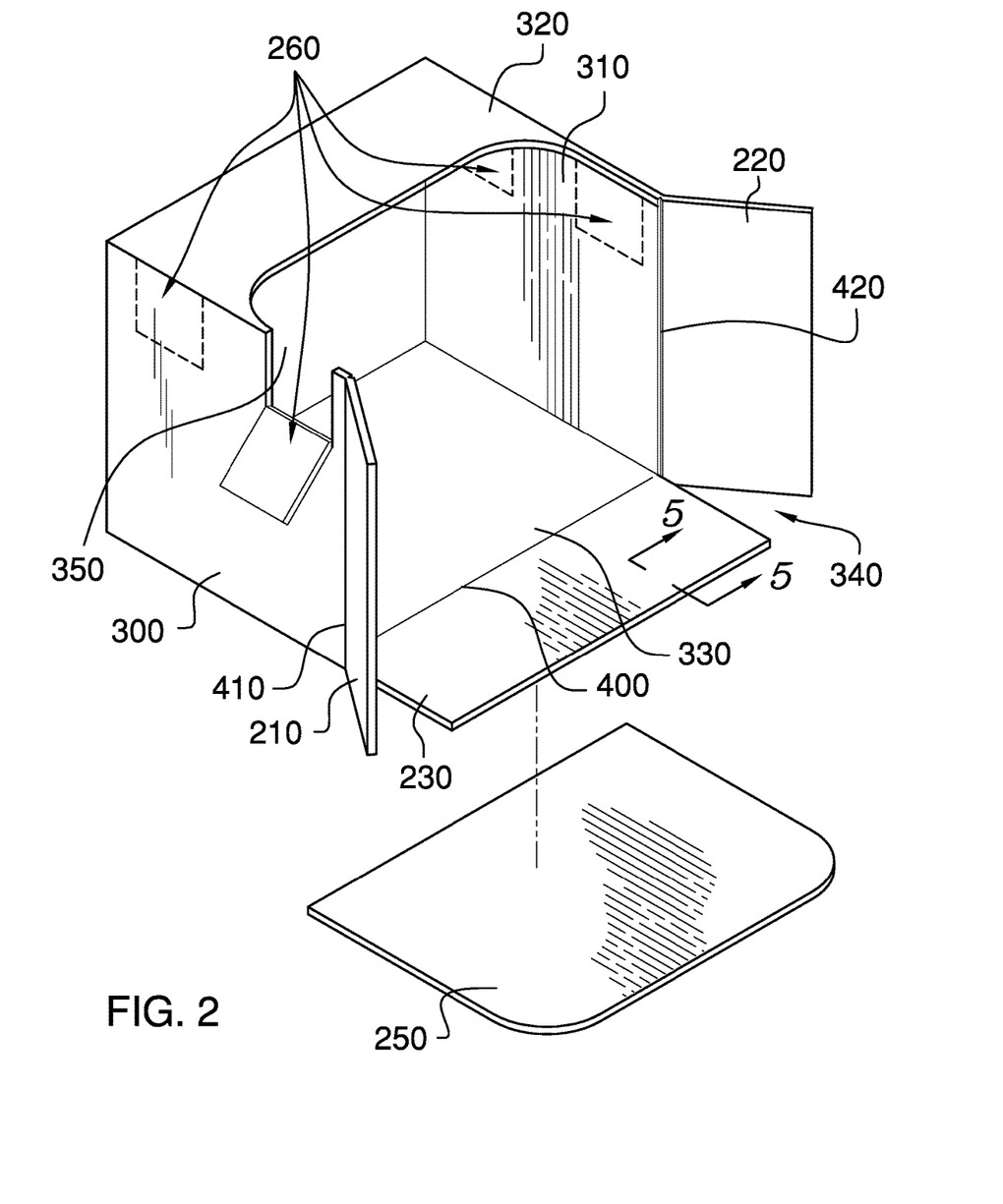
FIG. 2 is an exploded view of an embodiment of the disclosure.
Figure 3:
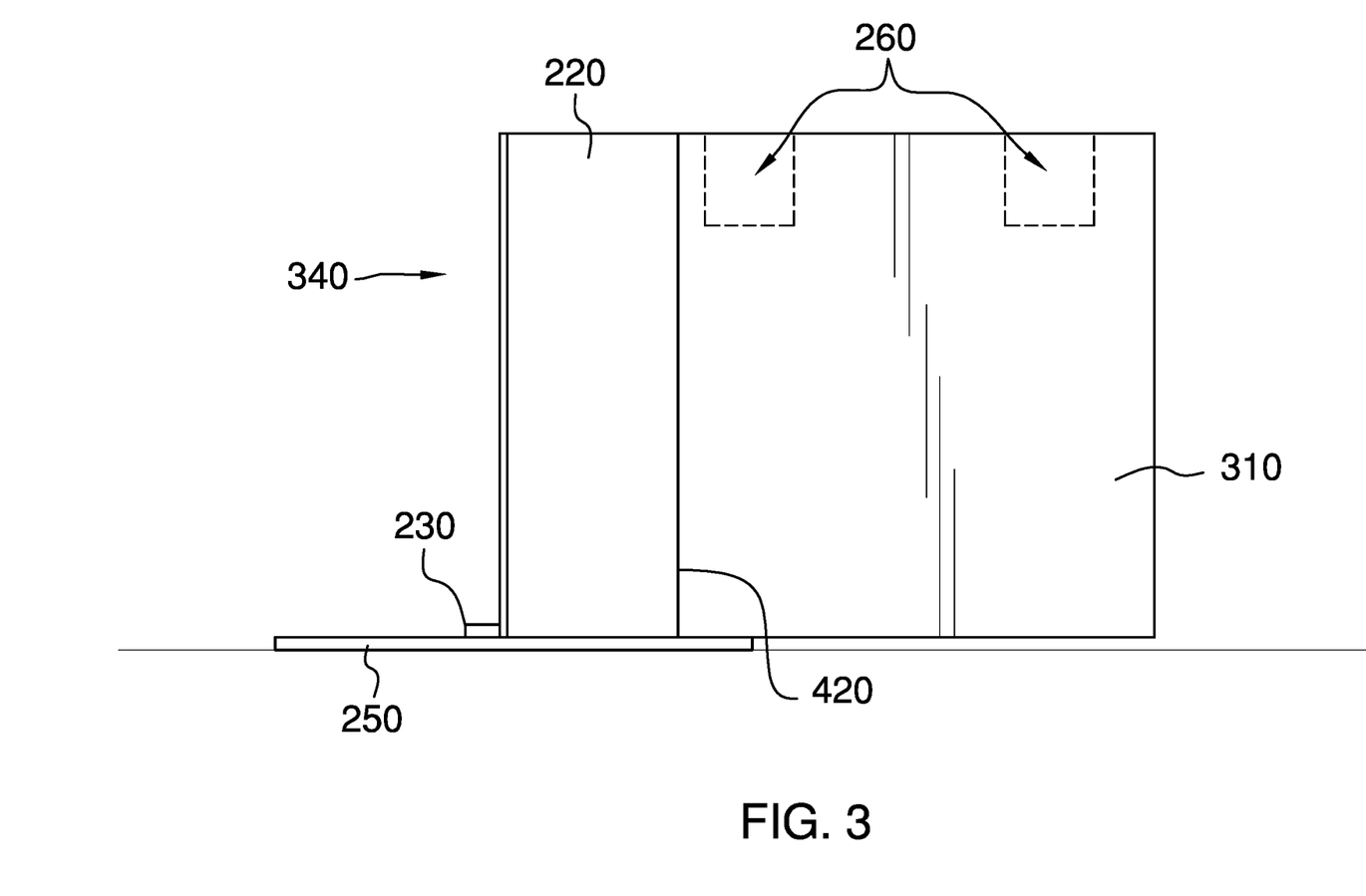
FIG. 3 is a side view of an embodiment of the disclosure.
Figure 4:
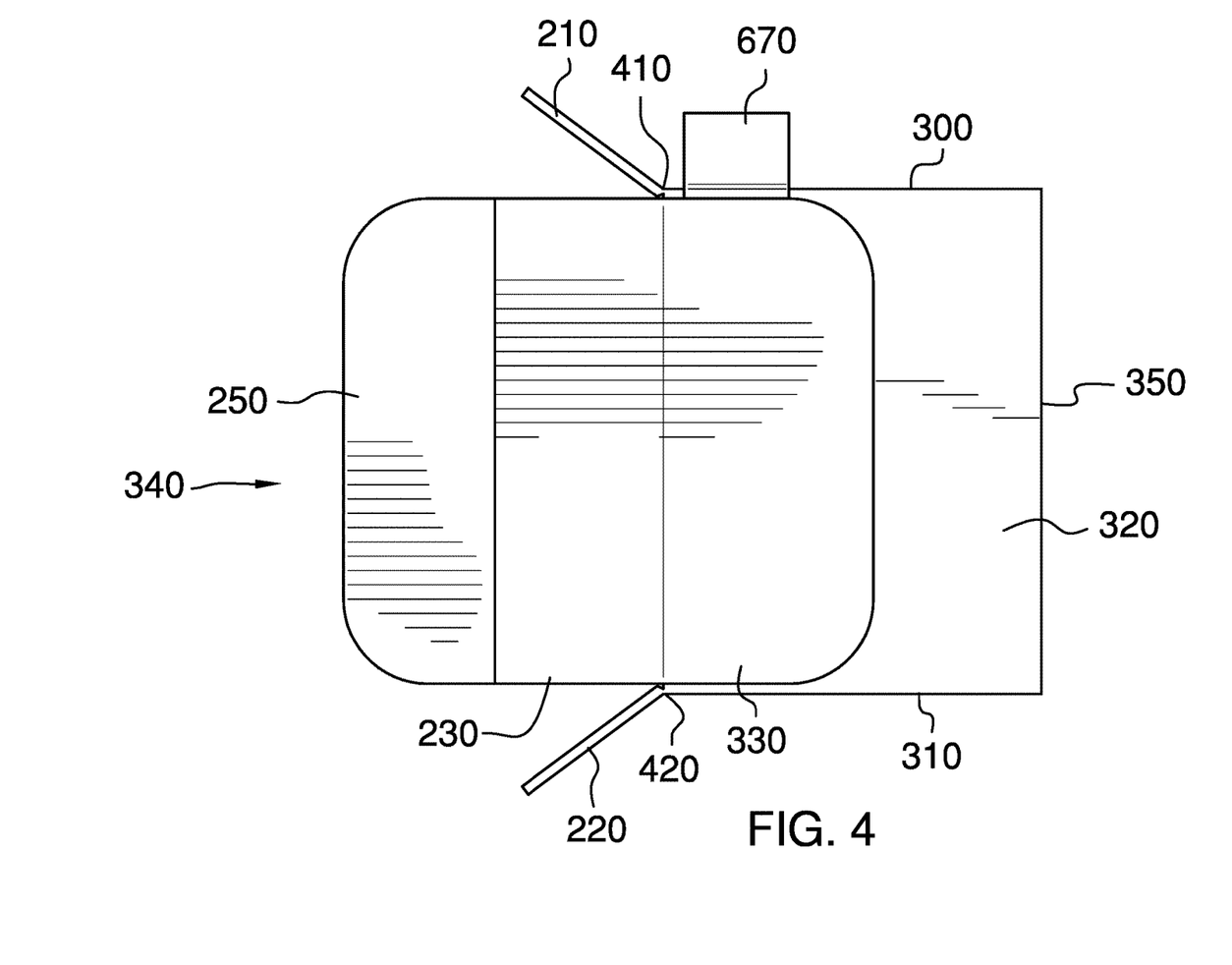
FIG. 4 is a top view of an embodiment of the disclosure.
Figure 5:
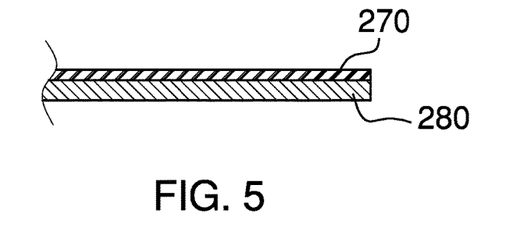
FIG. 5 is a cross-sectional view of an embodiment of the disclosure across 5-5 as shown in FIG. 2.
Figure 6:
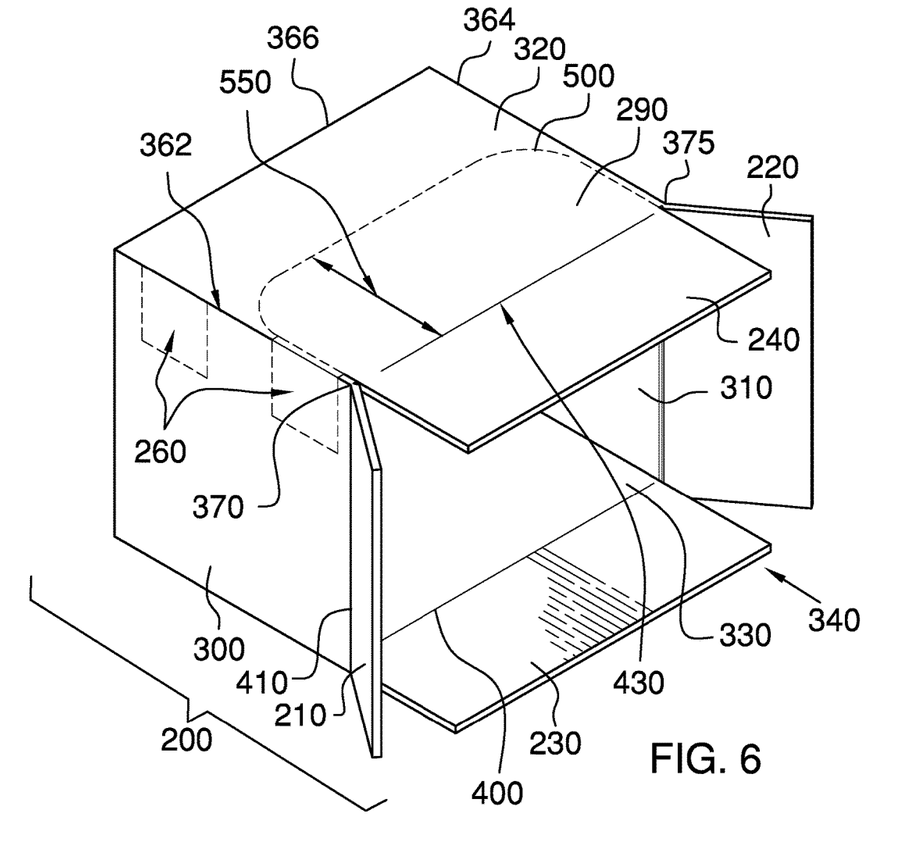
FIG. 6 is an isometric view of an embodiment of the disclosure before detachable portions and cut-outs are removed.
Figure 7:
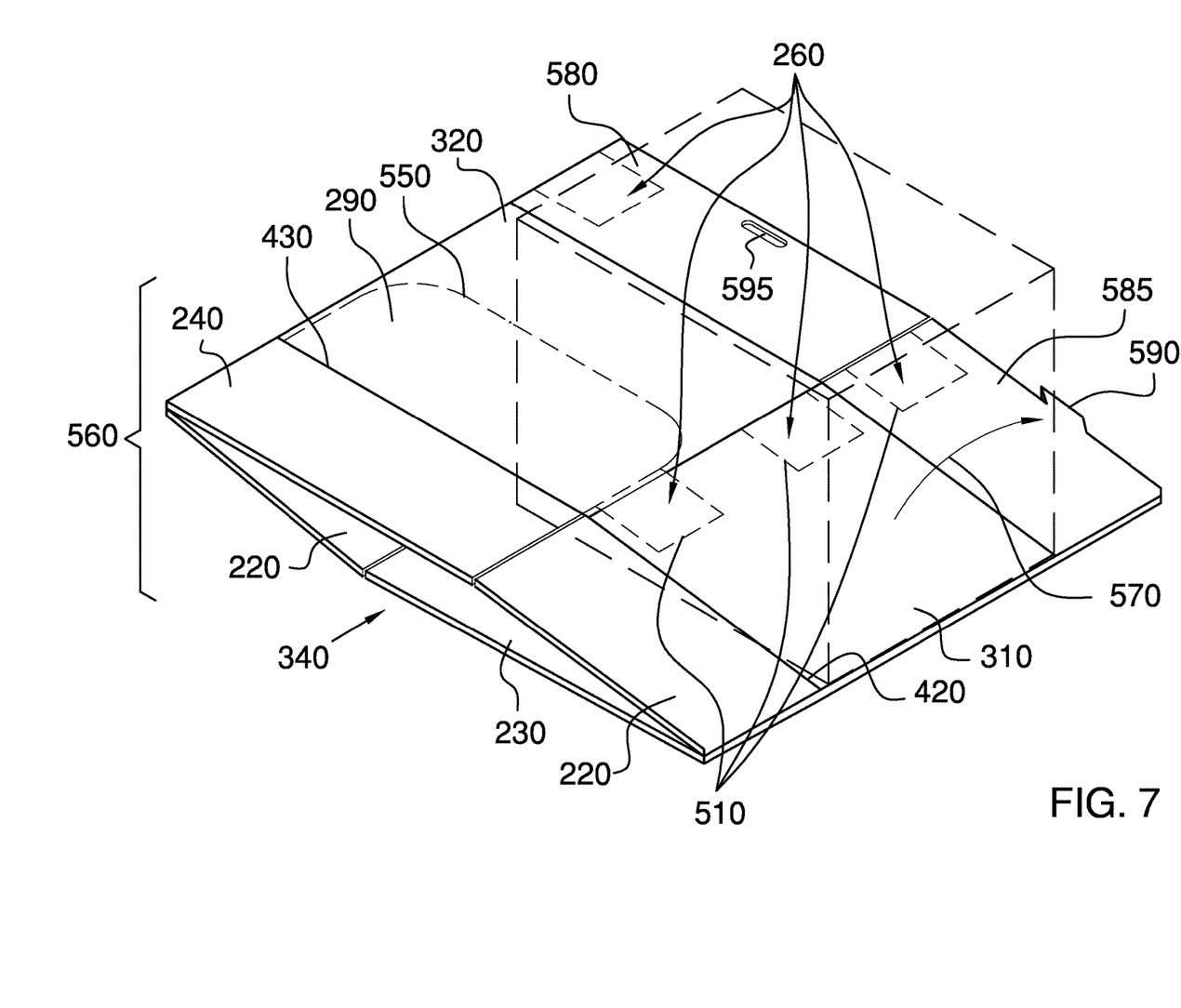
FIG. 7 is an illustration of an enclosure flattened for shipping according to an embodiment of the invention.

In some embodiments, the invention 100 may be sold in a flat package 560 for easy transportation from the store where purchased to the user's home. As a non-limiting example, this may be done by having the box back side 350 comprise two separate flaps: a left back flap 580 and a right back flap 585. The right back flap 585 has a tab 590 that mates with a slot 595 on the left back flap 580 to reform the box back side 350. For shipping the tab 590 may be disengaged from the slot 595 and with the front and back sides of the invention 100 now open the box right side 310 can be pushed to one side or the other to cause the invention 100 to fold flat (as shown in FIG. 7).

It may then be shrink-wrapped or otherwise packaged for sale and shipped to stores. Upon reaching the use's home the flat package 560 may unfold 570 by having the box left side 300 and the box right side 310 swing up to a vertical orientation again while the box floor 330 remains flat against the room floor 650. Then the tab 590 on the right back flap 585 may be inserted into the slot 595 on the left back flap 580 to reform the box back side 350 and to provide the invention 100 with some rigidity.

In use, the invention 100 is purchased and brought home. If sold as the flat package 560 it may be unfolded and restored to the form of a box as previous described. The detachable floor mat 250 may then be removed and placed aside until the invention 100 is in place. If the one or more night light cut-outs 260 will be used then the one or more second perforations 510 corresponding to the one or more night light cut-outs 260 being used are separated to remove the one or more night light cut-outs 260 from the invention 100.

The invention 100 may be moved to an area of a room where it is desired to keep the litter box 600 and the litter box 600 may be placed inside of the invention 100. The detachable floor mat 250 may be placed under the bottom flap 230 and under the litter box 600. The litter box 600 may be filled with litter 620 and is then ready for use by a cat 610. After a period of time the invention 100 may become soiled to the point where it is no longer desirable to have it in the building. At that time the litter box 600 may be emptied and removed from the invention 100 and the invention 100 may be disposed of properly.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A litter box enclosure comprising:
   a protective box;
   wherein the protective box opens on a box front side and a litter box is placed on a box floor of the protective box so that a box left side, a box right side, a box back side, and a box top are interposed between the litter box and a room side wall, a room rear wall, and a room floor thus protecting nearby walls and floors from urine and feces damage;
   a bottom flap, a left flap, a right flap, a top flap, and a floor mat;
   wherein a first edge connects the bottom flap to the box floor along the front of the box floor;
   wherein the connection between the bottom flap and the box floor is a fold;
   wherein the angle formed by the bottom flap relative to the box floor can be reoriented;
   wherein a second edge connects the left flap to the box left side along the front edge of the box left side;
   wherein the connection between the left flap and the box left side is a fold;
   wherein the angle formed by the left flap relative to the box left side can be reoriented;
   wherein the left flap provides additional protection to the room side wall and the room floor near the litter box enclosure 10 by constituting an additional physical barrier through which urine and feces would have to pass from the litter box to reach the room side wall and portions of the room floor;
   wherein a third edge connects the right flap to the box right side along the front edge of the box right side;
   wherein the connection between the right flap and the box right side is a fold;
   wherein the angle formed by the right flap relative to the box right side can be reoriented;
   wherein the right flap provides additional protection to the room side wall and the room floor near the litter box enclosure by constituting an additional physical barrier through which urine and feces would have to pass from the litter box to reach the room side wall and portions of the room floor;
   wherein a fourth edge connects the top flap to the box top along a front edge of the box top;
   wherein the connection between the top flap and the box top is a fold;
   wherein the angle formed by the top flap relative to the box top can be reoriented;
   wherein the detachable comprises the top flap and a front portion of the box top;
   wherein a first perforation makes it possible to separate the detachable floor mat from the rest of the litter box enclosure;
   wherein the detachable floor mat is separated from the remainder of the litter box enclosure by breaking the litter box enclosure along the first perforation.

2. The litter box enclosure according to claim 1
   wherein the first perforation begins at a front left corner of the box top;
   wherein the first perforation runs for a first distance along a left edge of the box top towards a back edge of the box top;
   wherein the first perforation then changes direction and runs perpendicular to the left edge of the box top and parallel to the fourth edge of the box top until it reaches a right edge of the box top;
   wherein the first perforation then changes direction and begins running towards the fourth edge of the box top along the right edge of the box top;
   wherein the first perforation continues in this direction until it reaches a front right corner.

3. The litter box enclosure according to claim 2
   wherein the transition of the first perforation from running along the left edge of the box top to running parallel to the fourth edge of the box top is a right angle.

4. The litter box enclosure according to claim 3
   wherein the transition of the first perforation from running parallel to the fourth edge of the box top to running along the right edge of the box top is a right angle.

5. The litter box enclosure according to claim 2
   wherein the transition of the first perforation from running along the left edge of the box top to running parallel to the fourth edge of the box top is a curve.

6. The litter box enclosure according to claim 5
   wherein the transition of the first perforation from running parallel to the fourth edge of the box top to running along the right edge of the box top is a curve.

7. The litter box enclosure according to claim 1
   wherein the shape of the first perforation defines a semi-circle extending from the front left corner to the front right corner.

8. The litter box enclosure according to claim 7
   Wherein the detachable floor mat is placed on the floor in front of the litter box enclosure and is slid under the bottom flap of the litter box enclosure thus forming an extended area of floor protection in front of the litter box enclosure.

9. The litter box enclosure according to claim 8 further comprising one or more night light cut-outs;
   wherein the one or more night light cut-outs comprise one or more second perforations which define areas of the litter box enclosure which are removable;
   wherein the litter box enclosure is placed such that at least one of the one or more night light cut-outs aligns with a night light plugged into a wall outlet;
   wherein the night light provide lights in the area of the litter box when the litter box is placed inside of the litter box enclosure.

10. The litter box enclosure according to claim 9
    wherein the one or more second perforations are located on the box left side, the box right side, the box back side, or combinations thereof.

11. The litter box enclosure according to claim 10
    wherein the one or more second perforations are located at two or more heights as measured from the floor thus allowing flexibility in matching the litter box enclosure placement relative to the wall outlet placement and height.

12. The litter box enclosure according to claim 11 wherein the litter box enclosure is constructed from a material that is impervious to urine and feces.

13. The litter box enclosure according to claim 12 wherein the litter box enclosure folds down into a flat package for easy transportation from the store where purchased to the user's home;

wherein the litter box enclosure unfolds by having the box left side and the box right side swing up to a vertical orientation again while the box floor remains flat against the room floor.

14. The litter box enclosure according to claim 13 wherein the box back side comprises a left back flap and a right back flap;

wherein the right back flap has a tab;

wherein the left back flap has a slot;

wherein for shipping purposes the tab may be disengaged from the slot and the box right side can be pushed to one a side to cause the litter box enclosure to fold flat;

wherein for using the litter box enclosure the tab is place in the slot to reform the box back side and to provide the litter box enclosure with some rigidity.

\* \* \* \* \*